Oct. 13, 1936.    T. H. WILLIAMS    2,057,467
EXTRUDING MACHINE
Filed Dec. 22, 1931    3 Sheets-Sheet 2

INVENTOR
THOMAS H. WILLIAMS
BY Ely & Barrow
ATTORNEYS

Oct. 13, 1936.   T. H. WILLIAMS   2,057,467
EXTRUDING MACHINE
Filed Dec. 22, 1931   3 Sheets-Sheet 3

INVENTOR
Thomas H. Williams
BY Ely & Barrow
ATTORNEYS

Patented Oct. 13, 1936

2,057,467

UNITED STATES PATENT OFFICE 2,057,467

EXTRUDING MACHINE

Thomas H. Williams, Akron, Ohio, assignor to National Rubber Machinery Company, Akron, Ohio, a corporation of Ohio Application December 22, 1931, Serial No. 582,532

4 Claims. (Cl. 18—14)

This invention relates to extruding machines, and more especially it relates to extruding machines of the dual type wherein two screws force plastic material from respective chambers through a single extrusion orifice.

The invention is of primary utility in extruding machines used for the manufacture of tubing, such as rubber tubing, wherein the plastic unvulcanized rubber composition is forced through an extrusion orifice defined by a mandrel and a circumscribing die.

The chief objects of the invention are to avoid the use of the usual spider for supporting the mandrel; to provide temperature control for the mandrel; to provide conveniently for adjusting the size of the extrusion orifice while the machine is in operation; to provide conveniently for conducting lubricant, such as soapstone dust, through the mandrel to the interior of the work; to provide a straight course for the lubricant so as to avoid abrasion of metal defining said course; to avoid local weakness or flat zones at the juncture of the material from the two chambers; and to provide an extruding machine of the dual type in which the two stocks unite with such small change in direction of flow that retarding friction is substantially obviated. A further object is to provide a tube of two materials having straight seams and a strong union of the materials at the seams.

Of the accompanying drawings.

Figure 1:
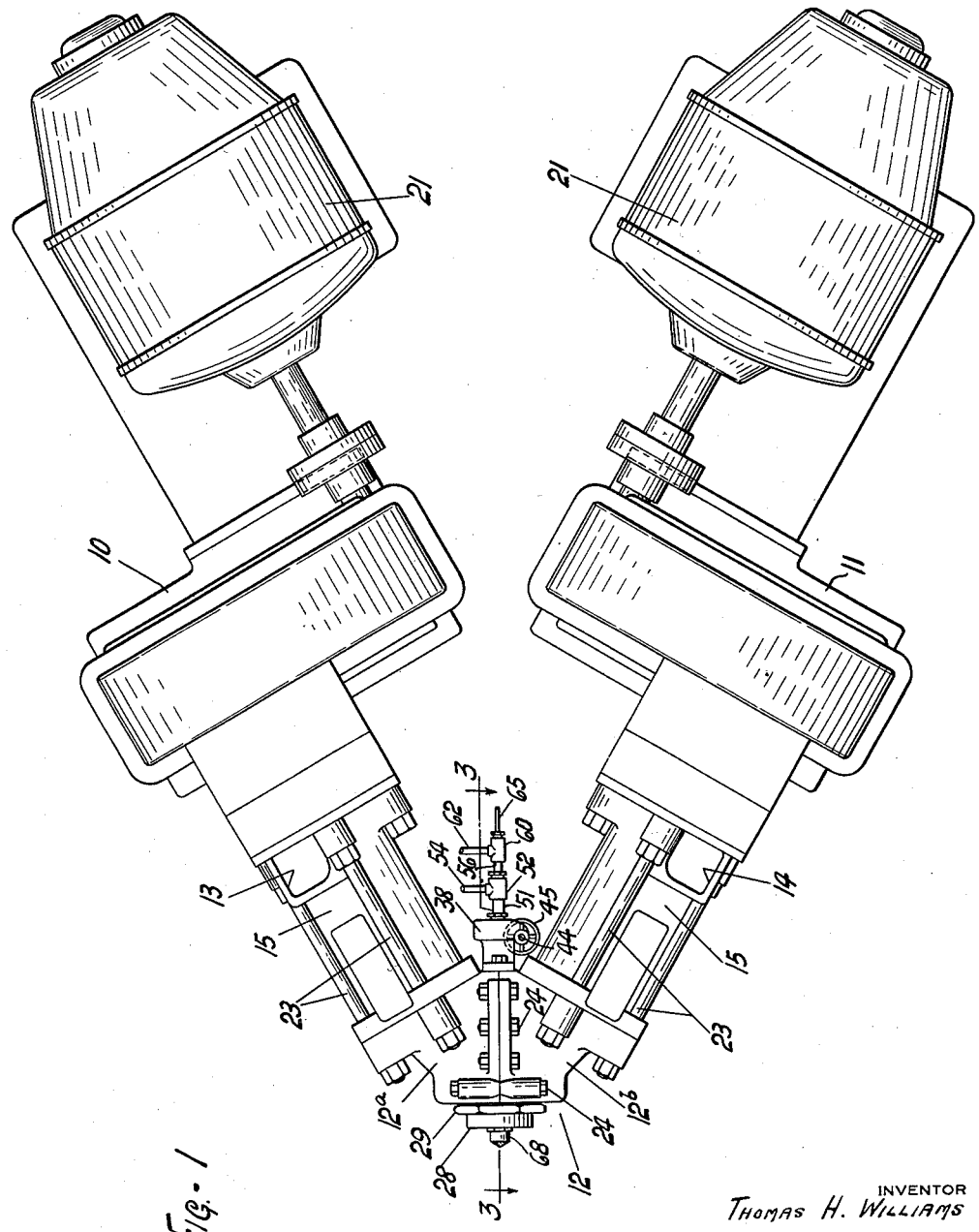
Figure 1 is a plan view of a machine embodying the invention, in its preferred form.

Referring to the drawings, 10, 11 are respective extruding machine units discharging into a head 12 that is common to said units, the latter being disposed at an angle of about 60 degrees to each other, which angle may be varied if desired. The extruding units 10, 11 may be substantially identical in construction, although preferably their stock-receiving apertures 13, 14 respectively are oppositely positioned to facilitate the feeding of stock thereinto. Each extruding unit 10, 11 comprises the usual barrel or housing 15, a sleeve 16 therein formed with stock chamber 17, said sleeve being spaced from the barrel 15 to define a space 18 therebetween for the reception of cooling or warming fluid, a feed screw 20 mounted in the stock chamber 17, and a motor 21 for driving said feed screw.

The head 12 comprises two lateral sections 12$^a$, 12$^b$ that are secured to the respective units 10, 11 by tie rods 23, 23 and are secured to each other by bolts 24, 24. Each section of the head is formed interiorly with a tubular stock passage 26 that constitutes a continuation of the stock chamber 17 of the respective extruding unit, and in the assembled head structure 12 the stock passages 26 merge into a single delivery passage 27 formed partly in section 12$^a$ and partly in section 12$^b$. Removably mounted in the head 12 at the delivery end of the passage 27 is an annular die 28 that is retained in place by a nut 29 threaded into the head. The die 28 is so positioned that the axis thereof bisects the angle at which the extruding units are positioned with relation to each other. Preferably the delivery end of the die 28 is interiorly tapered as shown at 30 for a purpose presently to be explained. The head sections 12$^a$, 12$^b$ are formed with respective passages 31, 31 for the reception of heating or cooling fluid.

Positioned coaxially of the die 28, within the head 12 and projecting from the rear thereof, is a tubular mandrel 33 that has a bell-shaped bead at its forward end, said bead being forwardly tapered at 34 at the same angle as the tapered portion 30 of the die 28. The mandrel is mounted for axial movement in the head 12 whereby the delivery orifice of the machine, which is the annular space between the tapered portions 30, 34 of the die and mandrel respectively, may be varied at will during the operation of the machine. To this end the rear end portion of the mandrel is threaded at 36, and threaded upon said threaded portion 36 is a worm gear 37 that abuts the head casting on one side, and has its other side engaged by a suitable housing 38 that is secured to said head casting. The arrangement is such as to prevent axial movement of the worm gear when it is rotated, whereby relative axial movement of the mandrel is effected. The rear end of the mandrel is formed with an elongate keyway 40 slidably engaging a key 41 in the head 12 whereby angular movement of the mandrel is prevented when the worm gear 37 is rotated. Rotation of the worm gear 37 is effected by means of a worm 43 that is journaled in the housing 38 upon shaft 44 that extends exteriorly of the latter and is provided thereat with an operating handle 45.

Mounted upon the mandrel 33 behind the bell-shaped head thereof are radially disposed separator plates 47, 47, (Figure 3) that extend to the inner periphery of the die 28, and behind the latter extend into respective recesses 48 formed in the abutting faces of the head sections 12ᵃ, 12ᵇ. The front margins of the plates 47, which are positioned a little behind the extrusion orifice of the machine, are serrated as shown at 49. The separator plates 47 may be positioned 180 degrees apart as shown, or at any other desired angle to each. The separator plates 47, in conjunction with the mandrel 33, serve to divide the delivery passage 27 into two parts whereby stock from the converging passages 26 is not united until it reaches a point adjacent the delivery orifice of the machine, the serrated front edges of the separator plates assuring an improved union of the two stocks. The arrangement is such that in tubes made by this apparatus the lines of juncture of the two stocks are substantially straight and parallel longitudinally of the tubes.

It is advantageous, in the extruding of plastic material, to control the temperature of said material, and in the present invention the temperature control means includes means for controlling the temperature of the mandrel. To this end a drain pipe 51 is mounted in the axial bore of the mandrel, extending from the hollow head thereof to a point beyond the rear end of the mandrel where an angle coupling 52 including a stuffing box 53 is provided, there being a flexible outlet pipe 54 connected to said coupling. A stuffing box 55 between the mandrel and the pipe 51 prevents leakage of fluid from the interior of the mandrel exteriorly of the pipe 51.

Mounted interiorly of the pipe 51 and spaced from the inner wall thereof is a fluid inlet pipe 56 that extends through the stuffing box 53, and has its front end supported in a suitable bore in an axial boss 57 that is formed on the inner face of a plate 58 that closes the front end of the mandrel 33. A plurality of radially directed ports 59, 59 extend from the bore in which the pipe 56 seats, whereby incoming fluid from the pipe 56 reaches the hollow interior of the mandrel head to warm or cool the same. The pipe 56 extends rearwardly of the stuffing box 53 and has its end provided with an angle coupling 60 including a stuffing box 61, there being a flexible inlet pipe 62 connected to said coupling. The arrangement is such that fluid from the pipe 62 passes through pipe 56 and out of ports 59 into the hollow head of the mandrel, and is withdrawn therefrom through pipes 51 and 54.

Figure 2:
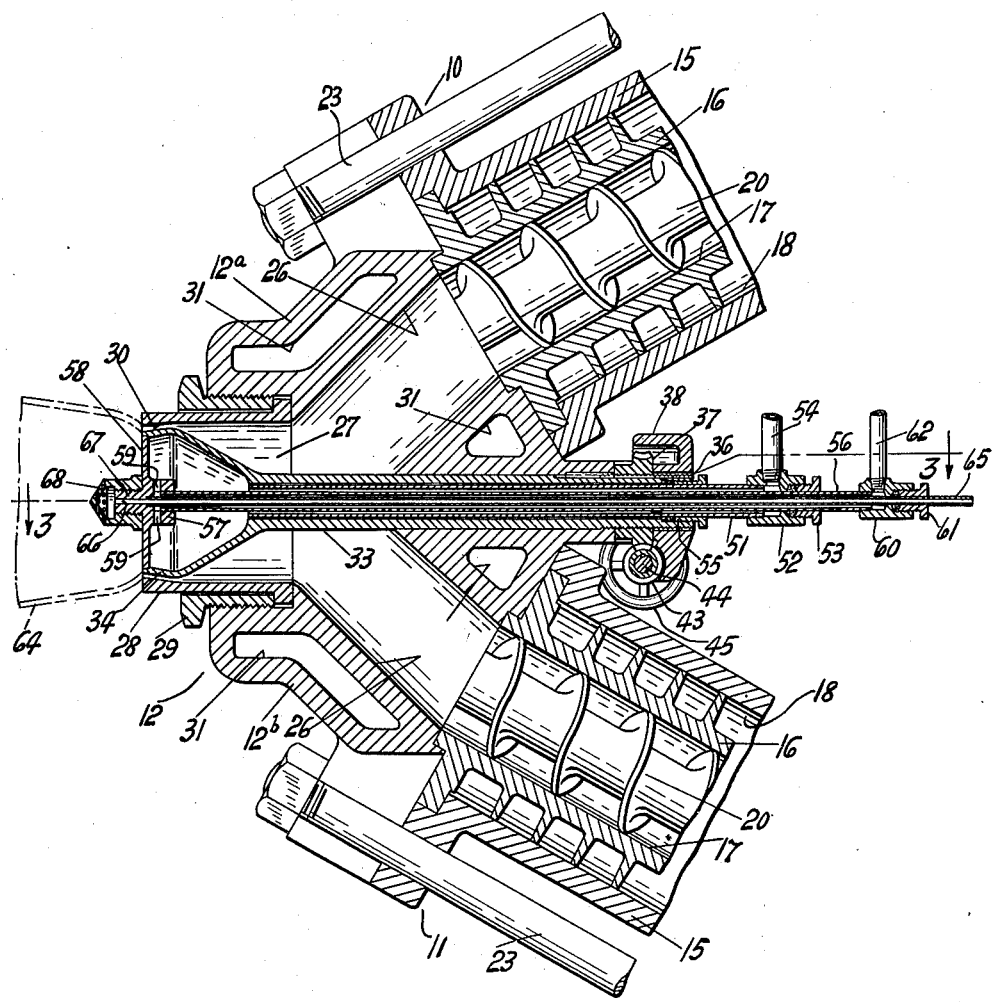
Figure 2 is a fragmentary horizontal section, on a larger scale, through the delivery end of the machine.
Figure 3:
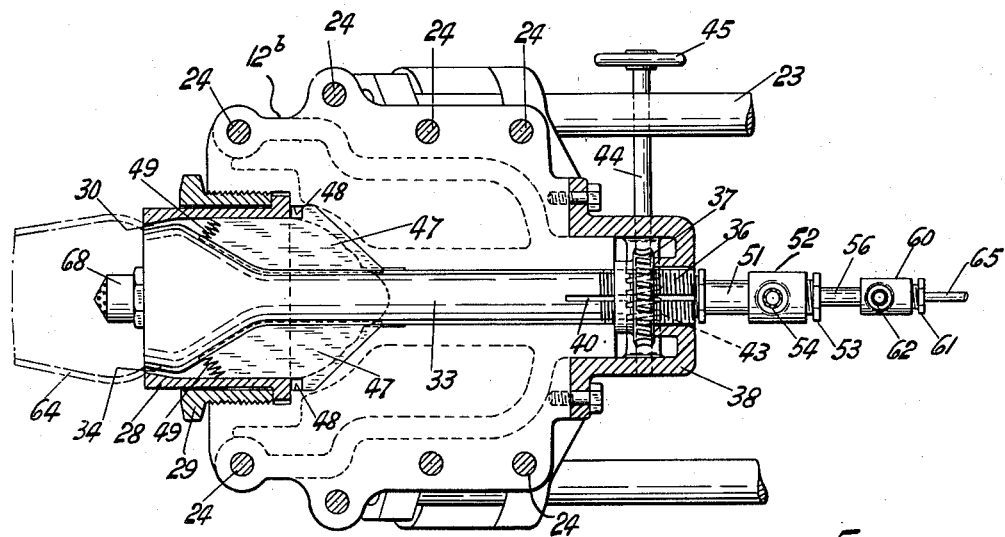
Figure 3 is a section on the line 3—3 of Figures 1 and 2.
Figure 4:
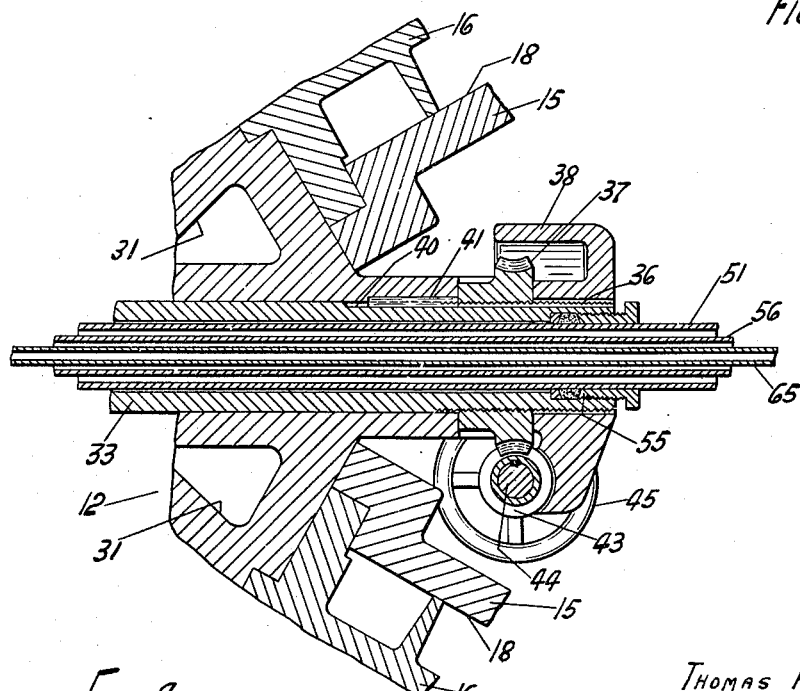
Figure 4 is an enlarged section detail of a portion of the structure shown in Figure 2.

Lubricant such as soapstone dust is conducted to the interior of the work, such as the tube 64 indicated in broken lines in Figures 2 and 3, by a pipe 65 that is mounted interiorly of the pipe 56 and spaced from the inner wall thereof. The pipe 65 extends through the stuffing box 61, and its front end is seated in a suitable axial bore 66 in the plate 58, said bore extending through an externally threaded boss 67 formed on the front of said plate. Upon the boss 67 is threaded a hollow distributor head 68 that has a conical end portion formed with a multiplicity of apertures for uniformly disseminating the lubricant delivered to the head through the pipe 65. The rear end of the pipe 65 is suitably connected to a source of supply of lubricant (not shown) said lubricant preferably being pneumatically propelled.

By means of the invention it is possible to make extruded tubes of two contrasting colors, or of two rubber compositions having different characteristics of elasticity, wear, or the like. The machine is capable of making tubes having straight seams, and a strong union of the different stocks at the seams. Optimum operating conditions are maintained by the improved temperature control in the machine, and the thickness of the work may be controlled at all times while the machine is in operation. The construction provides a straight passage for the lubricant so that there is the minimum of abrasion in the pipes that convey it, the distributor head 68 being easily and quickly replaced when worn. The invention obviates the use of a spider for supporting the mandrel, so that the latter is more rigidly supported and not as susceptible to deflection. Flat zones in the work, such as are caused by the usual mandrel-supporting spiders, are absent in the work produced by this machine.

Modifications may be resorted to without departing from the spirit of the invention, or the scope of the appended claims.

What is claimed is:

1. An extruding machine comprising a head formed with an extrusion orifice the axis of which is at an angle to the machine, a mandrel mounted in said head having its front end disposed within said extrusion orifice, means for effecting temperature control of the mandrel, means for conducting lubricant through the mandrel and ejecting it from the front end thereof, and means for axially adjusting the position of the mandrel with relation to the extrusion orifice.

2. An extruding machine comprising a pair of extruding units disposed at an angle to each other, a delivery head common to said units formed with a single extrusion orifice, a mandrel mounted for axial movement in the head having one end disposed within the extrusion orifice, a pair of radial separator plates mounted on the mandrel and extending into respective slots in the inner wall of the head, for preventing union of the stocks from the extruding units, and means for effecting axial movement of the mandrel.

3. An extruding machine comprising a pair of extruding units disposed at an angle to each other, a delivery head common to said units formed with a single extrusion orifice, a mandrel having one end disposed within said extrusion orifice, a pair of separator plates mounted on said mandrel and extending to the inner wall of the head for preventing union of the stocks from the extruding units to a point adjacent the extrusion orifice, means for adjusting the axial position of the mandrel, and means preventing angular movement of the mandrel during such adjustment.

4. An extruding machine comprising a pair of extruding units disposed at an angle to each other, a delivery head common to said units formed with a single extrusion orifice, a mandrel having one end disposed within said extrusion orifice, and a pair of separator plates extending from said mandrel to the inner wall of the head for preventing union of the stocks from the extruding units until said stocks reach a point adjacent the extrusion orifice, the margins of the respective separator plates nearest the extrusion orifice being serrated.

THOMAS H. WILLIAMS.